(12) United States Patent
Saito et al.

(10) Patent No.: US 10,976,648 B2
(45) Date of Patent: Apr. 13, 2021

(54) INFORMATION PROCESSING APPARATUS, INFORMATION PROCESSING METHOD, AND PROGRAM

(71) Applicant: Sony Mobile Communications Inc., Tokyo (JP)

(72) Inventors: Yuichiro Saito, Shinagawa-ku (JP); Shinji Matsuda, Shinagawa-ku (JP); Tomoki Hamajima, Shinagawa-ku (JP)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 16/470,244

(22) PCT Filed: Dec. 22, 2017

(86) PCT No.: PCT/JP2017/046255
§ 371 (c)(1),
(2) Date: Jun. 17, 2019

(87) PCT Pub. No.: WO2018/154954
PCT Pub. Date: Aug. 30, 2018

(65) Prior Publication Data
US 2019/0310538 A1   Oct. 10, 2019

(30) Foreign Application Priority Data
Feb. 24, 2017   (JP) .............................. JP2017-033594

(51) Int. Cl.
*G03B 21/14* (2006.01)
*G03B 17/54* (2021.01)
(Continued)

(52) U.S. Cl.
CPC ............. *G03B 21/14* (2013.01); *G03B 17/54* (2013.01); *G06F 3/01* (2013.01); *G06F 3/012* (2013.01);
(Continued)

(58) Field of Classification Search
CPC .......... G03B 21/14; G03B 17/54; G06T 7/70; G06T 7/00; G06F 3/01; G06F 3/012;
(Continued)

(56) References Cited

U.S. PATENT DOCUMENTS 6,460,999 B1   10/2002 Suzuki
9,535,538 B2 *   1/2017 Yagishita .............. G06F 3/0425
(Continued)

FOREIGN PATENT DOCUMENTS

EP   2 744 206 A1   6/2014
JP   2003-44839 A   2/2003
(Continued)

OTHER PUBLICATIONS

Extended European Search Report dated Dec. 9, 2019, issued in corresponding European Patent Application No. 17897499.4.
(Continued)

*Primary Examiner* — Michelle M Iacoletti
*Assistant Examiner* — Magda Cruz
(74) *Attorney, Agent, or Firm* — Xsensus, LLP

(57) ABSTRACT

A technology that allows a user to view image information more comfortably has been demanded.
The present disclosure provides an information processing apparatus including a control unit that controls a person detection unit on the basis of an irradiation direction in which an irradiation unit capable of irradiating various image information irradiates the image information, the person detection unit forming a detection area in a direction opposite to the irradiation direction. According to the pres-
(Continued)

ent disclosure, the person detection unit is controlled on the basis of the irradiation direction, whereby an operation unintended by a user is less likely to be performed. The user can thus view the image information more comfortably.

12 Claims, 4 Drawing Sheets

(51) Int. Cl.
*G06F 3/01* (2006.01)
*H04N 5/33* (2006.01)
*G09G 5/00* (2006.01)
*G09G 5/36* (2006.01)
*G06T 7/70* (2017.01)
*G06T 7/00* (2017.01)

(52) U.S. Cl.
CPC ............... *G06F 3/017* (2013.01); *G06T 7/00* (2013.01); *G06T 7/70* (2017.01); *G09G 5/00* (2013.01); *G09G 5/36* (2013.01); *H04N 5/33* (2013.01)

(58) Field of Classification Search
CPC . G06F 3/017; G09G 5/00; G09G 5/36; G09G 3/20; H04N 5/33; H04N 5/74
See application file for complete search history.

(56) References Cited

U.S. PATENT DOCUMENTS

| | | | |
|---|---|---|---|
| 9,690,427 B2 * | 6/2017 | Ono | G06F 3/042 |
| 2007/0001111 A1 | 1/2007 | Rueb et al. | |
| 2011/0169776 A1 * | 7/2011 | Ouchi | G06F 3/0425 |
| | | | 345/175 |
| 2011/0216236 A1 * | 9/2011 | Kasahara | H04N 5/23219 |
| | | | 348/370 |
| 2011/0221918 A1 * | 9/2011 | Kasahara | G03B 17/20 |
| | | | 348/222.1 |
| 2011/0304833 A1 | 12/2011 | Osaka et al. | |
| 2012/0154661 A1 * | 6/2012 | Shimada | H04N 5/23254 |
| | | | 348/333.1 |
| 2013/0070232 A1 | 3/2013 | Izukawa | |
| 2014/0198030 A1 * | 7/2014 | Takazawa | G06K 9/2036 |
| | | | 345/156 |
| 2016/0105653 A1 * | 4/2016 | Yamamoto | G06F 3/0304 |
| | | | 348/744 |
| 2016/0309127 A1 * | 10/2016 | Narikawa | G06F 3/0346 |

FOREIGN PATENT DOCUMENTS

| | | |
|---|---|---|
| JP | 2008-287142 A | 11/2008 |
| JP | 2013-65061 A | 4/2013 |
| WO | 2015/092905 A1 | 6/2015 |
| WO | WO-2016129489 A1 * | 8/2016 ............... H04N 5/74 |

OTHER PUBLICATIONS

International Search Report and Written Opinion dated Feb. 13, 2018 for PCT/JP2017/046255 filed on Dec. 22, 2017, 8 pages including English Translation of the International Search Report.

* cited by examiner

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2017/046255, filed Dec. 22, 2017 which claims priority to JP 2017-033594, filed Feb. 24, 2017, the entire contents of each are incorporated herein by reference.

TECHNICAL FIELD

The present disclosure relates to an information processing apparatus, an information processing method, and a program.

BACKGROUND ART

Patent Document 1 discloses a projection apparatus including an irradiation unit that can irradiate various image information.

CITATION LIST

Patent Document

Patent Document 1: Japanese Patent Application Laid-Open No. 2003-044839

SUMMARY OF THE INVENTION

Problems to be Solved by the Invention

Now, such a projection apparatus has been required to have a technology that allows a user to view the image information more comfortably.

Thus, the present disclosure proposes a new and improved information processing apparatus that allows a user to view image information more comfortably.

Solutions to Problems

The present disclosure provides an information processing apparatus including a control unit that controls a person detection unit on the basis of an irradiation direction in which an irradiation unit capable of irradiating various image information irradiates the image information, the person detection unit forming a detection area in a direction opposite to the irradiation direction.

Furthermore, the present disclosure further provides an information processing method including a control unit controlling a person detection unit on the basis of an irradiation direction in which an irradiation unit capable of irradiating various image information irradiates the image information, the person detection unit forming a detection area in a direction opposite to the irradiation direction.

Furthermore, the present disclosure further provides a program that causes a computer to implement a control function that controls a person detection unit on the basis of an irradiation direction in which an irradiation unit capable of irradiating various image information irradiates the image information, the person detection unit forming a detection area in a direction opposite to the irradiation direction.

Effects of the Invention

As described above, according to the present disclosure, the person detection unit is controlled on the basis of the irradiation direction so that an operation unintended by a user is less likely to be performed. The user can thus view the image information more comfortably. Note that the above effect is not necessarily restrictive, but any of the effects illustrated in the present specification or other effects that can be perceived from the present specification may be achieved together with the above effect or in place of the above effect.

MODE FOR CARRYING OUT THE INVENTION

Figure 1:
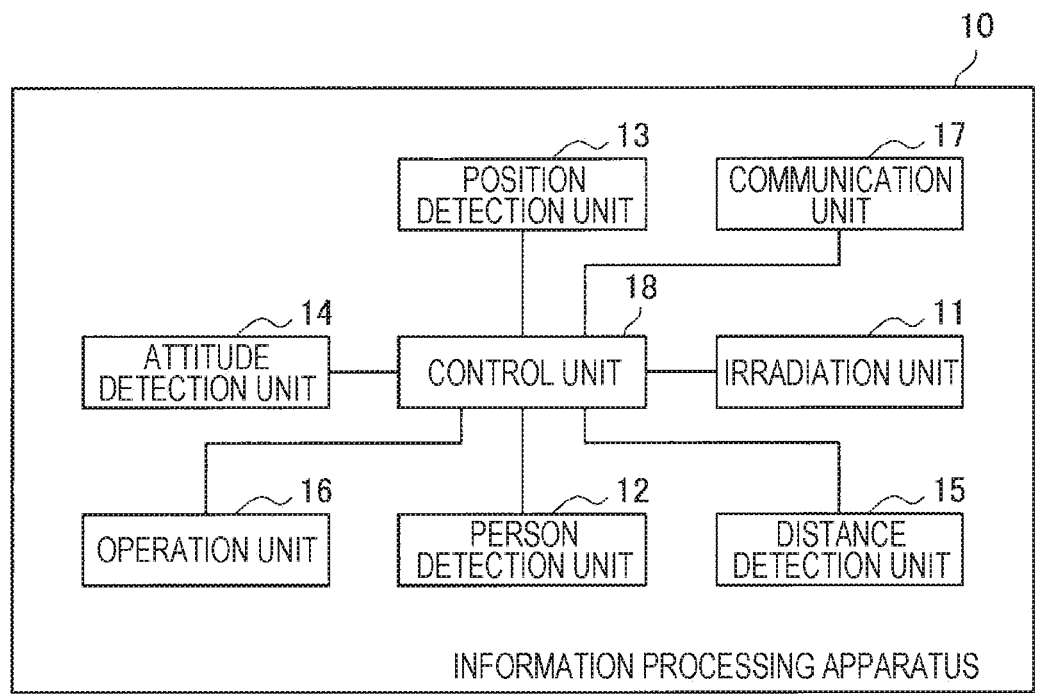
FIG. 1 is a functional block diagram of an information processing apparatus according to an embodiment of the present disclosure.

A preferred embodiment of the present disclosure will now be described in detail with reference to the drawings. Note that in the present specification and the drawings, components having substantially the same functional configuration are assigned the same reference numeral, whereby redundant description will be omitted.

Note that the description will be made in the following order.

1. Configuration of information processing apparatus
2. Processing by information processing apparatus
2-0. Basic processing
2-1. First modification of basic processing
2-2. Second modification of basic processing
2-3. Third modification of basic processing

1. Configuration of Information Processing Apparatus

First, the configuration of an information processing apparatus 10 according to the present embodiment will be described on the basis of FIGS. 1 to 3. The information processing apparatus 10 includes an irradiation unit 11, a person detection unit 12, a position detection unit 13, an attitude detection unit 14, a distance detection unit 15, an operation unit 16, a communication unit 17, and a control unit 18. The information processing apparatus 10 is a projection apparatus, for example. The information processing apparatus 10 includes the configuration of hardware such as a central processing unit (CPU), a read only memory (ROM), a random access memory (RAM), a non-volatile memory, an irradiation device, a person detection device, a position detection device, an attitude detection device, a distance detection device, an operation button, and a communication device. Information necessary for the operation of the information processing apparatus 10 such as a program is recorded in the ROM. The CPU reads and executes the program recorded in the ROM. As a result, the irradiation unit 11, the person detection unit 12, the position detection unit 13, the attitude detection unit 14, the operation unit 16, the communication unit 17, and the control unit 18 are implemented.

Figure 2:
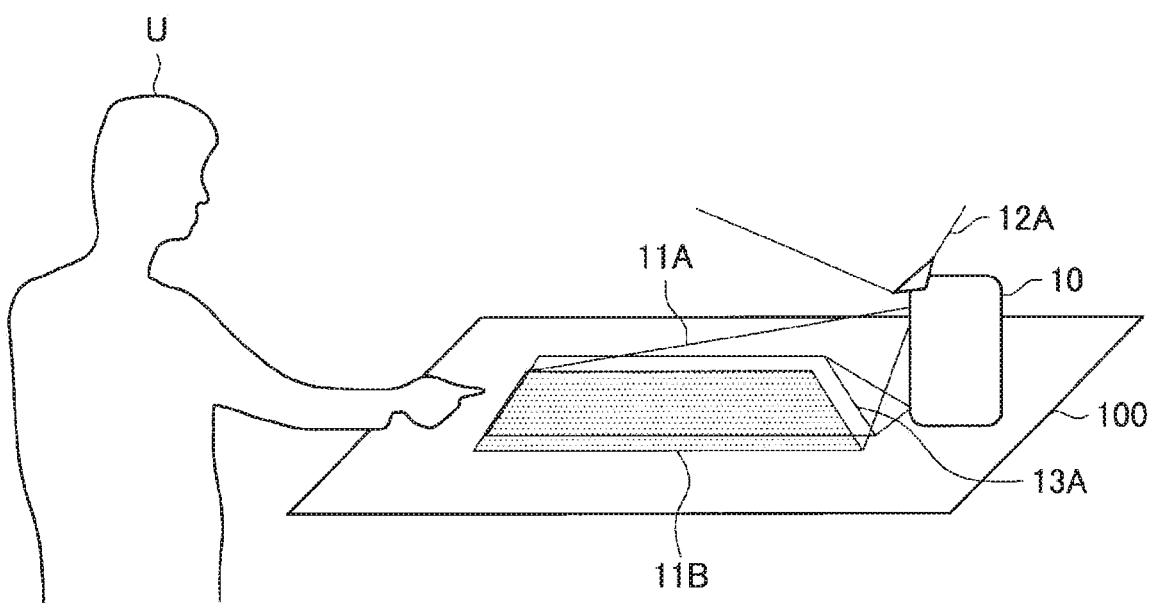
FIG. 2 is an explanatory view illustrating an example of installation of the information processing apparatus.
Figure 3:
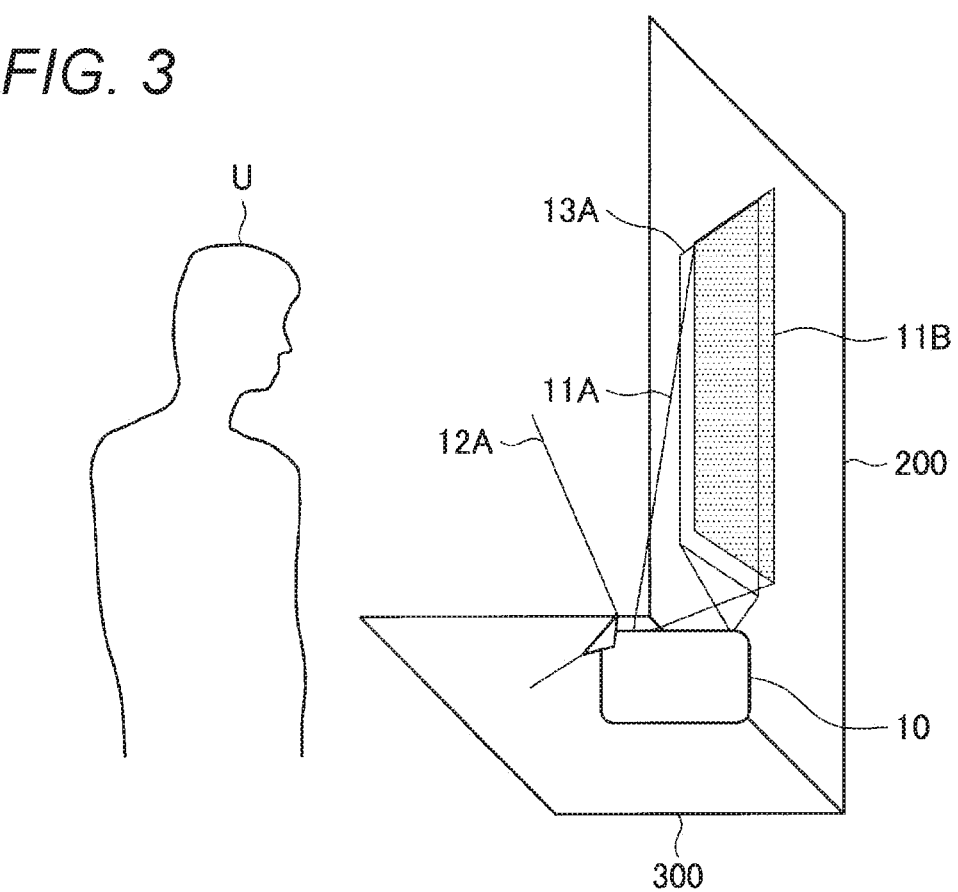
FIG. 3 is an explanatory view illustrating an example of installation of the information processing apparatus.

The irradiation unit 11 includes the irradiation device, for example, and irradiates various image information within an irradiation area 11A as illustrated in FIG. 2. In this example, the irradiation unit 11 irradiates the image information on a horizontal surface 100. In this case, a surface where the irradiation area 11A and the horizontal surface 100 intersect is an irradiation surface 11B. The image information is displayed on the irradiation surface 11B. Here, the horizontal surface 100 includes, for example, a table top of a desk or the like, a floor, or the like.

An optical axis of the irradiation unit 11 (that is, a central axis of the irradiation area 11A) is slightly tiled toward an outer wall surface of the information processing apparatus 10 from a direction perpendicular to the outer wall surface. Moreover, the direction of the optical axis, that is, an irradiation direction, can change depending on an installation state (that is, an attitude) of the information processing apparatus 10. The irradiation direction includes a downward direction illustrated in FIG. 2 or an upward direction illustrated in FIG. 3, for example. The downward direction is a direction below a horizontal direction, and the upward direction is a direction above the horizontal direction. In a case where the irradiation direction is the upward direction as illustrated in FIG. 3, the irradiation unit 11 irradiates the image information on a vertical surface 200, for example. In the example of FIG. 3, the information processing apparatus 10 is placed on a horizontal surface 300. Then, a surface where the irradiation area 11A and the vertical surface 200 intersect is the irradiation surface 11B. The image information is displayed on the irradiation surface 11B. Here, the vertical surface 200 includes, for example, a wall surface, a side surface of various objects, or the like. A user (a person U illustrated in FIG. 2) can display the image information on the horizontal surface 100 by placing the information processing apparatus 10 on the horizontal surface 100 and setting the irradiation direction in the downward direction. Alternatively, the user can display the image information on the vertical surface 200 by placing the information processing apparatus 10 near the vertical surface 200 and setting the irradiation direction in the upward direction. The information processing apparatus 10 can thus display the image information at various positions desired by the user. It is needless to say that the angle between the optical axis of the irradiation unit 11 and the outer wall surface of the information processing apparatus 10 and the types of the irradiation direction are not limited to the above. Furthermore, the surface on which the image information is to be irradiated is not limited to the horizontal surface 100 and the vertical surface 200.

The person detection unit 12 includes the person detection device, for example, and detects a person. Here, the person detection device includes, for example, a human sensor, a camera, and the like. The human sensor detects a person by detecting heat of the person and/or a movement of the heat. The camera detects a person by imaging the person. The information processing apparatus 10 need only include either the human sensor or the camera, but may include both. As illustrated in FIG. 2, the person detection unit 12 forms a detection area 12A in a direction opposite to the irradiation direction (that is, the optical axis of the irradiation unit 11) in which the irradiation unit 11 irradiates the image information. Here, a person to be detected is, for example, the user of the information processing apparatus 10. The person detection unit 12 detects a person within the detection area 12A. An angle between an optical axis of the detection area 12A (that is, a central axis of the detection area 12A) and the optical axis of the irradiation unit 11 is larger than 900, for example. In a case where the person detection unit 12 detects a person, the person detection unit generates person detection information to that effect and outputs the information to the control unit 18. In a case where the control unit 18 acquires the person detection information, the control unit causes the irradiation unit 11 to irradiate the image information. Note that simply including the person detection unit 12 in the information processing apparatus 10 possibly causes an operation unintended by the user as described later. In the present embodiment, the person detection unit 12 is controlled on the basis of the irradiation direction of the irradiation unit 11, whereby an operation unintended by the user is less likely to be performed. Note that although the person detection unit 12 of the present embodiment forms the detection area 12A in the direction opposite to the irradiation direction in which the irradiation unit 11 irradiates the image information, the detection area 12A may be formed in a direction different from the irradiation direction (irradiation surface).

The position detection unit 13 includes the position detection device, for example, and detects an object present within the irradiation area 11A of the image information. The position detection device includes an infrared sensor, for example. Specifically, the position detection unit 13 is driven in conjunction with the control unit 18 and the irradiation unit 11, and detects an object present within a detection area 13A. In the present embodiment, the detection area 13A covers substantially an entire area of the irradiation surface 11B. A target to be detected by the position detection unit 13 is a hand (more specifically, a finger) of a person, for example. Accordingly, the user can perform an input operation (for example, a tap operation, a drag operation, a pinch-in/out operation, and the like) on the image information displayed on the irradiation surface 11B. The position detection unit 13 detects such an input operation and outputs position detection information regarding a result of the detection to the control unit 18. The control unit 18 performs processing based on the position detection information such as processing of changing the image information. The detection area 13A of the position detection unit 13 is of course not limited to the above example but may cover, for example, only a part of the irradiation surface 11B.

The attitude detection unit 14 includes the attitude detection device, for example, and detects an attitude of the information processing apparatus 10. The attitude detection device includes a gyro sensor, an acceleration sensor, or the like, for example. The attitude detection unit 14 outputs attitude detection information regarding a result of detection to the control unit 18. The control unit 18 determines the irradiation direction on the basis of the attitude detection information. Then, the control unit 18 then controls the person detection unit 12 on the basis of the irradiation direction. Details of the control will be described later.

The distance detection unit 15 includes the distance detection device, for example, and measures a distance between the information processing apparatus 10 and the irradiation surface 11B. The distance detection device includes a range sensor, for example. The range sensor measures the distance between the information processing apparatus 10 and the irradiation surface 11B using a laser, ultrasound, or the like. Specifically, the distance detection unit 15 measures a distance from a surface of the information processing apparatus 10 facing the irradiation surface 11B to the irradiation surface 11B, the surface being one of the outer wall surfaces of the information processing apparatus. This distance corresponds to the length of a perpendicular drawn from the surface facing the irradiation surface 11B to a plane including the irradiation surface 11B (which is the vertical surface 200 in the example of FIG. 3. The distance detection unit 15 outputs distance detection information regarding the distance detected to the control unit 18.

The operation unit 16 includes the operation button and the like, for example, and allows an input operation by the user. The operation button here includes a power button, for example. In a case where the user performs an input operation on the operation unit 16, the operation unit outputs input operation information regarding the input operation to the control unit 18. The control unit 18 performs processing corresponding to the input operation. For example, the control unit 18 activates the information processing apparatus 10 in a case where the user presses the power button. Moreover, the control unit 18 causes the irradiation unit 11 to stop irradiation of the image information in a case where the user presses the power button, that is, performs an irradiation stop operation, while the information processing apparatus 10 is activated. The control unit 18 thus causes the information processing apparatus 10 to shift to a sleep mode. Note that such a state is also referred to as a standby mode, a suspend mode, or the like. The control unit 18 causes the irradiation unit 11 to restart irradiation of the image information in a case where the user presses the power button, that is, performs an irradiation restart operation, during the sleep mode.

The communication unit 17 includes the communication device, for example, and communicates with another information processing apparatus or the like. As a result, the communication unit 17 acquires various kinds of information such as the image information from the other information processing apparatuses or the like.

The control unit 18 includes a CPU or the like, for example, and controls each component of the information processing apparatus 10. Furthermore, the control unit 18 also controls the person detection unit 12 on the basis of the irradiation direction. Furthermore, the control unit 18 performs each processing described above. Details of the processing will be described later.

2. Processing by Information Processing Apparatus 2-0. Basic Processing

Figure 6:
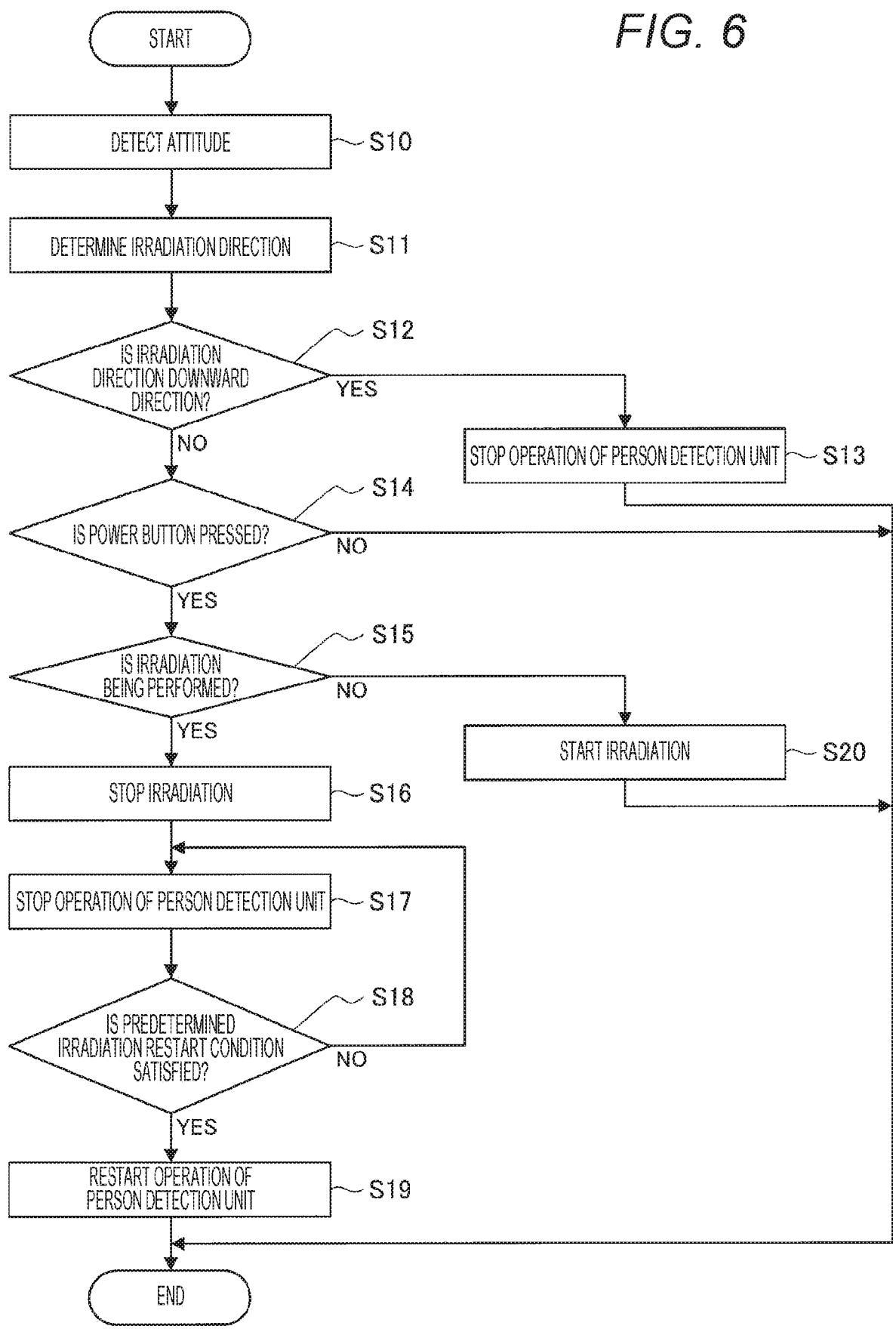
FIG. 6 is a flowchart illustrating the procedure of processing by the information processing apparatus.

Next, the procedure of the processing performed by the information processing apparatus will be described with reference to the flowchart illustrated in FIG. 6. The basic processing will be described first. In step S10, the attitude detection unit 14 detects an attitude of the information processing apparatus 10 (for example, in which direction the placement of the apparatus allows for irradiation). The attitude detection unit 14 outputs attitude detection information regarding a result of detection to the control unit 18. In step S11, the control unit 18 determines the irradiation direction on the basis of the attitude detection information. Here, the control unit 18 determines whether the irradiation direction is the downward direction illustrated in FIG. 2 or the upward direction illustrated in FIG. 3.

In step S12, the control unit 18 determines whether or not the irradiation direction is the downward direction (a first direction). The control unit 18 proceeds to step S13 if the irradiation direction is the downward direction (the first direction), that is, the irradiation direction is horizontal to the ground, and the irradiation surface is on a desk or a floor. On the other hand, the control unit 18 proceeds to step S14 if the irradiation direction is the upward direction (a second direction different from the first direction), that is, the irradiation direction is perpendicular to the ground, and the irradiation surface is on a wall.

In step S13, the control unit 18 stops the operation of the person detection unit 12. As a result, for example, the following effects can be expected. That is, in the case where the irradiation direction is the downward direction, the detection area 12A of the person detection unit 12 is upward as illustrated in FIG. 2. Thus, a ceiling light or the like possibly enters the detection area 12A of the person detection unit 12. Such a light is also a source of heat. Therefore, in a case where the person detection unit 12 includes the human sensor, the light may be detected as a person by mistake. In this case, the person detection unit 12 outputs person detection information to the control unit 18 so that the control unit 18 causes the irradiation unit 11 to irradiate the image information. The irradiation unit 11 thus possibly irradiates the image information even in a case where the user does not intend to view the image information. Moreover, since the user does not intend to view the image information, an object (for example, a glass or the like) may be put on the irradiation surface 11B. In this case, the position detection unit 13 possibly detects the presence of the object and outputs position detection information to the control unit 18. The control unit 18 in this case possibly performs processing unintended by the user. For example, in a case where an icon is displayed at the position of the object, the control unit 18 possibly determines by mistake that the user has selected the icon. As a result, the information processing apparatus 10 may perform an operation unintended by the user. Thus, in the present embodiment, the control unit 18 stops the operation of the person detection unit 12 in the case where the irradiation direction is the downward direction.

Note that in this case, the user switches the presence or absence of irradiation by pressing the power button. In other words, the user turns on the power button in a case where the irradiation unit 11 does not perform irradiation of the image information (that is, during the sleep mode). The control unit 18 thus causes the irradiation unit 11 to restart irradiation of the image information. Furthermore, in a case where the user wishes to stop the irradiation, the user presses the power button again. The control unit 18 thus causes the irradiation unit 11 to stop the irradiation of the image information. In other words, the information processing apparatus 10 shifts to the sleep mode. The information processing apparatus 10 can thus perform processing in accordance with the intention of the user, whereby the user can view the image information more comfortably. The control unit 18 thereafter ends the present basic processing.

On the other hand, in a case where the control unit 18 proceeds from step S12 to step S14, it determines whether or not the power button has been pressed. The control unit 18 proceeds to step S15 if the power button has been pressed, or ends the present basic processing if the power button has not been pressed.

In step S15, the control unit 18 determines whether or not the irradiation unit 11 is irradiating the image information. The control unit 18 proceeds to step S16 if the irradiation unit 11 is irradiating the image information. The control unit 18 proceeds to step S20 if the irradiation unit 11 is not irradiating the image information, that is, in the sleep mode.

In step S16, the control unit 18 causes the irradiation unit 11 to stop irradiation of the image information. In other words, the control unit 18 causes the information processing apparatus 10 to shift to the sleep mode. In this case, the pressing of the power button in step S14 is the irradiation stop operation.

In step S17, the control unit 18 stops the operation of the person detection unit 12. In step S18, the control unit 18 determines whether or not a predetermined irradiation restart condition is satisfied. The control unit 18 proceeds to step S19 if the irradiation restart condition is satisfied, or returns to step S17 if the irradiation restart condition is not satisfied. In other words, the control unit 18 waits until the irradiation restart condition is satisfied. In the present basic processing, the irradiation restart condition is a condition that a predetermined time has elapsed since the irradiation stop operation.

In step S19, the control unit 18 restarts the operation of the person detection unit 12. The control unit 18 thereafter causes the irradiation unit 11 to restart irradiation of the image information in a case where the person detection unit 12 detects a person (for example, the user). The control unit 18 thereafter ends the present basic processing.

Thus, after the information processing apparatus 10 shifts to the sleep mode, the control unit 18 stops the operation of the person detection unit 12 until the predetermined irradiation restart condition is satisfied. The following effects can be expected as a result. That is, in a case where the processing after step S14 is performed, the irradiation direction is the upward direction illustrated in FIG. 3. The detection area 12A of the person detection unit 12 is thus oriented in a direction away from the vertical surface 200. Therefore, the person detection unit 12 can detect a person facing the vertical surface 200.

Thus, in a case where the operation of the person detection unit 12 continues at the time the information processing apparatus 10 shifts to the sleep mode, the person detection unit 12 outputs person detection information to the control unit 18. Then, the control unit 18 then causes the irradiation unit 11 to restart irradiation of the image information on the basis of the person detection information. Therefore, the information processing apparatus 10 possibly releases the sleep mode immediately after shifting to the sleep mode.

Figure 4:
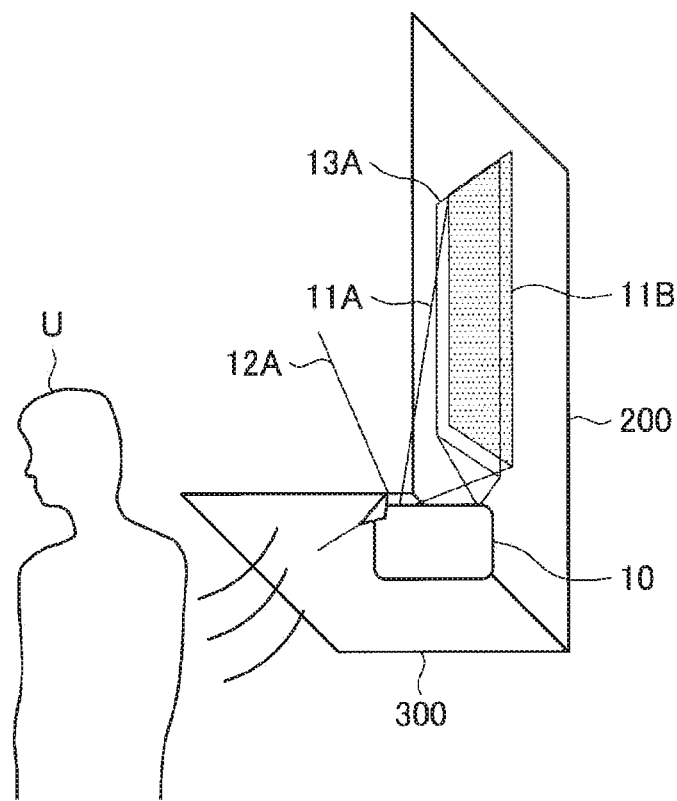
FIG. 4 is an explanatory view illustrating an example of use of the information processing apparatus.

However, the above operation may not be intended by the user. In other words, the user often presses the power button not with the intention to cause such an operation but in order to stop the irradiation by the irradiation unit 11 for a while. Various cases are assumed for such a situation to occur such as a case where the user has another business to take care of. In this case, it is assumed that the user leaves the information processing apparatus 10 as illustrated in FIG. 4.

Figure 5:
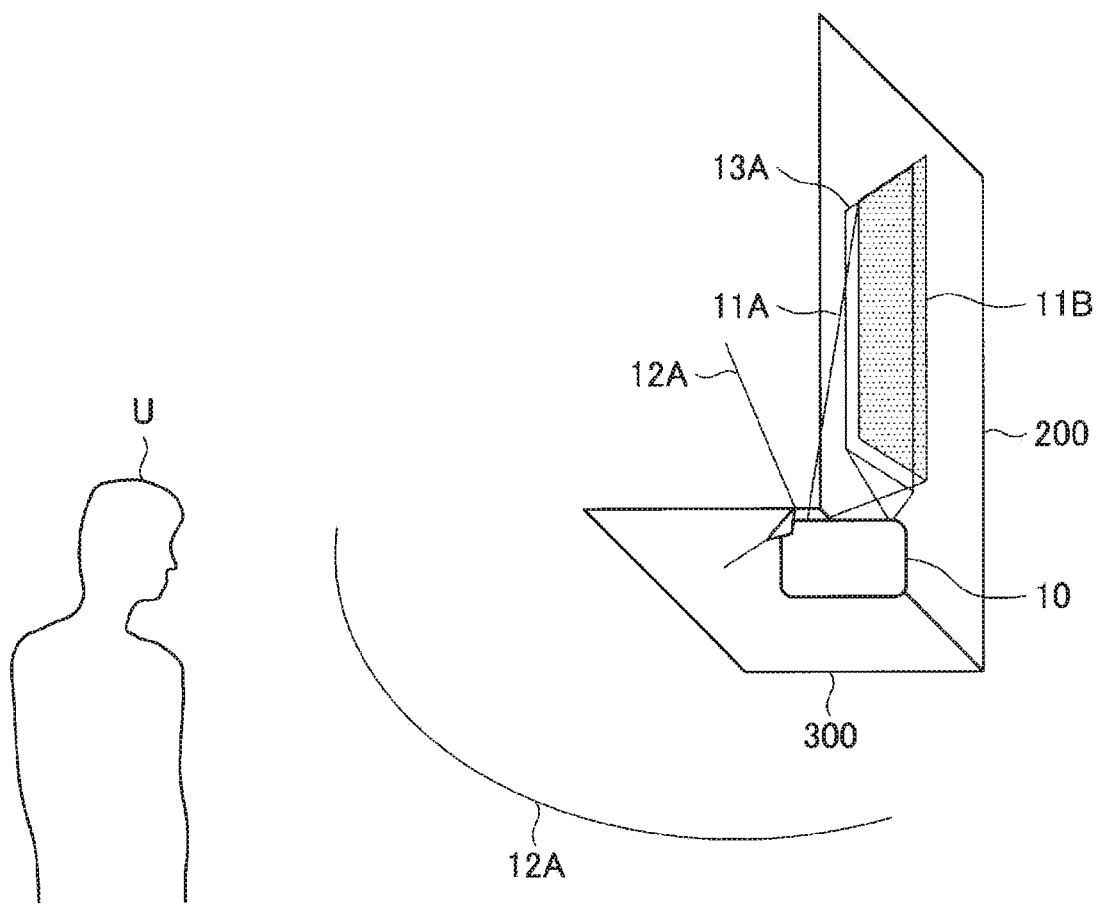
FIG. 5 is an explanatory view illustrating an example of use of the information processing apparatus.

Accordingly, in the present embodiment, after the information processing apparatus 10 shifts to the sleep mode, the control unit 18 stops the operation of the person detection unit 12 until the predetermined irradiation restart condition is satisfied. More specifically, the control unit 18 stops the operation of the person detection unit 12 until a predetermined time elapses after the irradiation stop operation is performed. This predetermined time is an estimated time until the user goes out of the detection area 12A of the person detection unit 12 as illustrated in FIG. 5. Therefore, the predetermined time may be set on the basis of, for example, the size of the detection area 12A, the speed of travel (for example, an average walking speed) of the user, or the like. The predetermined time may be 10 seconds, for example.

The control unit 18 can thus restart the operation of the person detection unit 12 after the user goes out of the detection area 12A of the person detection unit 12. In this case, since the user is outside the detection area 12A, the sleep mode is not released even if the operation of the person detection unit 12 is restarted. The user thereafter takes care of the other business and enters the detection area 12A. In response to this, the person detection unit 12 outputs person detection information to the control unit 18. The control unit 18 causes the irradiation unit 11 to restart irradiation of the image information. The information processing apparatus 10 can therefore perform processing in accordance with the intention of the user. Here, in a case where the camera is used as the person detection unit 12, the control unit 18 may cause the irradiation unit 11 to restart the irradiation in a case where the camera detects the face of the user. In other words, the irradiation unit 11 may restart the irradiation after it is acknowledged that the user has started viewing the image information. Alternatively, the camera and the human sensor may be used in combination. In this case, the control unit 18 first restarts the operation of only the human sensor in a case where the operation of the person detection unit 12 is restarted. Then, the control unit 18 also restarts the operation of the camera in a case where the human sensor detects a person. Moreover, the control unit 18 may then cause the irradiation unit 11 to restart the irradiation in a case where the camera detects the face of the user.

In step S20, the control unit 18 causes the irradiation unit 11 to restart the irradiation of the image information. In this case, the pressing of the power button in step S14 is the irradiation start operation. The control unit 18 thereafter ends the present basic processing.

2-1. First Modification of Basic Processing

Next, a first modification of the basic processing will be described. In the first modification, the control unit 18 sets the aforementioned predetermined time on the basis of the distance between the information processing apparatus 10 and the irradiation surface 11B. Information regarding the distance is given from the distance detection unit 15. The following effects can be expected as a result. That is, the user in some cases wishes to view the image information at a distance from the information processing apparatus 10 because the irradiation surface 11B is large. In this case, the user is assumed to leave the information processing apparatus 10 after temporarily setting the information processing apparatus 10 to the sleep mode. Then, the distance the user moves away from the information processing apparatus 10 to an extent is assumed to be longer as the irradiation surface 11B is larger. In other words, the larger the irradiation surface 11B, the longer the time for which the user moves. Also, the irradiation surface 11B is larger as the distance between the information processing apparatus 10 and the irradiation surface 11B is longer. The control unit 18 thus sets the aforementioned predetermined time on the basis of the distance between the information processing apparatus 10 and the irradiation surface 11B. Specifically, the control unit 18 sets the predetermined time to a longer time as the distance between the information processing apparatus 10 and the irradiation surface 11B is longer. As a result, the control unit 18 can restart the operation of the person detection unit 12 after the user has reached a desired position. The information processing apparatus 10 can therefore perform processing in accordance with the intention of the user.

Note that in a case where the person detection unit 12 is the human sensor and is sensitivity adjustable, the control unit 18 may adjust the sensitivity of the person detection unit 12 on the basis of the distance between the information processing apparatus 10 and the irradiation surface 11B. As a result, the person detection unit 12 can detect the user more reliably even if the user is away from the information processing apparatus 10. Alternatively, in a case where the camera is used as the person detection unit 12, the control unit 18 may cause the irradiation unit 11 to restart the irradiation in a case where the camera detects the face of the user. The camera and the human sensor may be used in combination. The specific processing is as described above.

2-2. Second Modification of Basic Processing

In a second modification, the person detection unit 12 is the camera. That is, the person detection unit 12 can detect the face of a person. Then, in step S17, the control unit 18 causes the person detection unit 12 to continue its operation. However, even if the person detection unit 12 outputs person detection information, the control unit 18 does not cause the irradiation unit 11 to restart the irradiation. Thereafter, in step S18, the control unit 18 determines whether or not an irradiation restart condition is satisfied. Here, the irradiation restart condition is that the person detection unit 12 stops detecting the face of a person and then detects the face of a person again.

In other words, the user who sets the information processing apparatus 10 to the sleep mode is assumed to turn his back on the information processing apparatus 10 and leave the information processing apparatus 10. In this case, the person detection unit 12 no longer detects the face of a person, that is, the face of the user. In a case where the user thereafter comes back near the information processing apparatus 10, the user turns his face to the information processing apparatus 10. Therefore, the person detection unit 12 again detects the face of a person, that is, the face of the user. At this time, the control unit 18 proceeds to step S19. Then, in step S19, the control unit 18 causes the irradiation unit 11 to restart irradiation of the image information. Thus, in the second modification as well, the information processing apparatus 10 can perform processing in accordance with the intention of the user. Particularly in the second modification, the person detection unit 12 detects the face of the user so that more accurate processing is possible.

2-3. Third Modification of Basic Processing

In a third modification, the person detection unit 12 is the camera. That is, the person detection unit 12 can detect a line of sight of a person. Then, in step S17, the control unit 18 causes the person detection unit 12 to continue its operation. However, even if the person detection unit 12 outputs person detection information, the control unit 18 does not cause the irradiation unit 11 to restart the irradiation. Thereafter, in step S18, the control unit 18 determines whether or not an irradiation restart condition is satisfied. Here, the irradiation restart condition is that a line of sight of a person detected by the person detection unit 12 moves outside the irradiation area 11A (more specifically, the irradiation surface 11B) of the image information and then moves back to the irradiation area 11A (more specifically, the irradiation surface 11B) of the image information.

In other words, the user who sets the information processing apparatus 10 to the sleep mode is assumed to move his line of sight away from the irradiation surface 11B. In this case, the person detection unit 12 detects that the line of sight of a person, that is, the line of sight of the user, has moved away from the irradiation surface 11B. The user thereafter moves his line of sight back to the irradiation surface 11B in a case where the user wishes to view the image information. Accordingly, the person detection unit 12 detects that the line of sight of a person, that is, the line of sight of the user, has moved back to the irradiation surface 11B. At this time, the control unit 18 proceeds to step S19. Then, in step S19, the control unit 18 causes the irradiation unit 11 to restart irradiation of the image information. Thus, in the third modification as well, the information processing apparatus 10 can perform processing in accordance with the intention of the user. Particularly in the third modification, the person detection unit 12 detects the line of sight of the user so that more accurate processing is possible.

Therefore, according to the present embodiment, the control unit 18 controls the person detection unit 12 on the basis of the irradiation direction. As a result, the control unit 18 is less likely to perform an operation unintended by the user. In other words, the control unit 18 can perform processing more in line with the intention of the user. The user can thus view the image information more comfortably.

Here, the irradiation direction includes at least one of the downward direction or the upward direction so that processing in line with the intention of the user can be performed in a case where the irradiation direction corresponds with one of these directions.

Moreover, the control unit 18 causes the irradiation unit 11 to irradiate the image information in a case where the person detection unit 12 detects a person or where a predetermined irradiation start operation is performed, and stops the operation of the person detection unit 12 in a case where the irradiation direction is the downward direction. As a result, the control unit 18 can perform processing more in line with the intention of the user.

Furthermore, the control unit 18 drives the position detection unit 13 in conjunction with the irradiation unit 11. Moreover, the control unit 18 then performs the aforementioned processing to be able to prevent misdetection by the position detection unit 13. As a result, the control unit 18 can perform processing more in line with the intention of the user.

Furthermore, the person detection unit 12 is in some cases the human sensor that detects a person by detecting heat. In this case as well, the control unit 18 can perform processing more in line with the intention of the user.

Moreover, the control unit 18 causes the irradiation unit 11 to irradiate the image information in a case where the person detection unit 12 detects a person or where a predetermined irradiation start operation is performed. Moreover, the control unit 18 also causes the irradiation unit 11 to stop the irradiation of the image information in a case where a predetermined irradiation stop operation is performed. Furthermore, in a case where the irradiation direction is the upward direction, the control unit 18 stops the operation of the person detection unit 12 until a predetermined irradiation restart condition is satisfied after the irradiation stop operation is performed. As a result, the control unit 18 can perform processing more in line with the intention of the user.

Moreover, the irradiation restart condition may be a lapse of a predetermined time since the irradiation stop operation is performed. In this case, the control unit 18 can perform processing more in line with the intention of the user.

Furthermore, the control unit 18 sets the predetermined time on the basis of the distance between the information processing apparatus 10 and the irradiation surface 11B. As a result, the control unit 18 can perform processing more in line with the intention of the user.

Furthermore, the person detection unit 12 in some cases is the human sensor that detects a person by detecting heat and is sensitivity adjustable. In this case, the control unit 18 adjusts the sensitivity of the person detection unit 12 on the basis of the distance between the information processing apparatus 10 and the irradiation surface 11B. As a result, the control unit 18 can perform processing more in line with the intention of the user.

Furthermore, the person detection unit 12 is in some cases the camera that can detect the face of a person. In this case, the irradiation restart condition may be that the person detection unit 12 stops detecting the face of a person and then detects the face of a person again. As a result, the control unit 18 can perform processing more in line with the intention of the user.

The person detection unit 12 is in some cases the camera that can detect the line of sight of a person. In this case, the irradiation restart condition may be that the line of sight of a person detected by the person detection unit 12 moves outside the irradiation surface 11B and thereafter moves back to the irradiation surface 11B. As a result, the control unit 18 can perform processing more in line with the intention of the user.

Although the preferred embodiments of the present disclosure have been described in detail with reference to the drawings, the technical scope of the present disclosure is not limited to such examples. It is apparent that a person having ordinary knowledge in the technical field of the present disclosure can conceive various modifications or amendments within the scope of the technical idea described in claims, where it is to be understood that such modifications or amendments naturally belong to the technical scope of the present disclosure.

For example, some of the components illustrated in FIG. 1 may be omitted. For example, the position detection unit 13, the distance detection unit 15, and the communication unit 17 may be omitted. Furthermore, the function of the control unit 18 may be performed by another information processing apparatus. In this case, the control unit 18 in the other information processing apparatus acquires necessary information (for example, person detection information, position detection information, attitude detection information, distance detection information, input operation information, and the like) from the information processing apparatus 10 and performs the aforementioned processing on the information processing apparatus 10.

In addition, the effects described in the present specification are merely illustrative or exemplary, and not restrictive. That is, the technology according to the present disclosure can achieve other effects apparent to those skilled in the art from the description of the present specification together with the above effects or in place of the above effects.

Note that the following configurations also belong to the technical scope of the present disclosure.

(1)

An information processing apparatus including a control unit that controls a person detection unit on the basis of an irradiation direction in which an irradiation unit capable of irradiating various image information irradiates the image information, the person detection unit forming a detection area in a direction opposite to the irradiation direction.

(2)

The information processing apparatus according to (1), in which the irradiation direction includes at least one of a downward direction or an upward direction.

(3)

The information processing apparatus according to (2), in which the control unit causes the irradiation unit to irradiate the image information in a case where the person detection unit detects a person or where a predetermined irradiation start operation is performed, and stops an operation of the person detection unit in a case where the irradiation direction is the downward direction.

(4)

The information processing apparatus according to (3), in which the control unit drives a position detection unit in conjunction with the irradiation unit, the position detection unit detecting a position of an object within an irradiation area of the image information.

(5)

The information processing apparatus according to (3) or (4), in which the person detection unit detects a person by detecting heat.

(6)

The information processing apparatus according to any one of (2) to (5), in which the control unit causes the irradiation unit to irradiate the image information in a case where the person detection unit detects a person or where a predetermined irradiation start operation is performed, causes the irradiation unit to stop the irradiation of the image information in a case where a predetermined irradiation stop operation is performed, and stops the operation of the person detection unit until a predetermined irradiation restart condition is satisfied after the irradiation stop operation is performed in a case where the irradiation direction is the upward direction.

(7)

The information processing apparatus according to (6), in which the irradiation restart condition is a lapse of a predetermined time since the irradiation stop operation is performed.

(8)

The information processing apparatus according to (7), in which the control unit sets the predetermined time on the basis of a distance between the information processing apparatus and an irradiation surface on which the image information is irradiated.

(9)

The information processing apparatus according to (8), in which the person detection unit detects a person by detecting heat and is sensitivity adjustable, and the control unit adjusts the sensitivity of the person detection unit on the basis of the distance between the information processing apparatus and the irradiation surface on which the image information is irradiated.

(10)

The information processing apparatus according to any one of (6) to (9), in which the person detection unit can detect a face of a person, and the irradiation restart condition is that the person detection unit stops detecting a face of a person and then detects a face of a person again.

(11)

The information processing apparatus according to any one of (6) to (10), in which the person detection unit can detect a line of sight of a person, and the irradiation restart condition is that a line of sight of a person detected by the person detection unit moves outside the irradiation area of the image information and then moves back to the irradiation area of the image information.

(12)

The information processing apparatus according to any one of (1) to (11), in which the information processing apparatus includes the irradiation unit and the person detection unit.

(13)

An information processing method including a control unit controlling a person detection unit on the basis of an irradiation direction in which an irradiation unit capable of irradiating various image information irradiates the image information, the person detection unit forming a detection area in a direction opposite to the irradiation direction.

(14)

A program that causes a computer to implement a control function that controls a person detection unit on the basis of an irradiation direction in which an irradiation unit capable of irradiating various image information irradiates the image information, the person detection unit forming a detection area in a direction opposite to the irradiation direction.

REFERENCE SIGNS LIST

10 Information processing apparatus
11 Irradiation unit
11A Irradiation area
11B Irradiation surface
12 Person detection unit
12A Detection area
13 Position detection unit
13A Detection area
14 Attitude detection unit
Distance detection unit
16 Operation unit
17 Communication unit
18 Control unit

The invention claimed is:

1. An information processing apparatus, comprising a control unit that controls a person detection unit on a basis of an irradiation direction in which an irradiation unit capable of irradiating various image information irradiates the image information, the person detection unit forming a detection area in a direction opposite to the irradiation direction,
   wherein the irradiation direction includes at least one of a downward direction or an upward direction,
   wherein the control unit causes the irradiation unit to irradiate the image information in a case where the person detection unit detects a person, and
   wherein the control unit determines the irradiation direction and causes the irradiation unit to stop the irradiation of the image information in a case where a predetermined irradiation stop operation is performed, and stops the operation of the person detection unit until a predetermined irradiation restart condition is satisfied after the irradiation stop operation is performed in a case where the irradiation direction is the upward direction.

2. The information processing apparatus according to claim 1, wherein the control unit causes the irradiation unit to irradiate the image information in a case where the person detection unit detects a person or where a predetermined irradiation start operation is performed, and stops an operation of the person detection unit in a case where the irradiation direction is the downward direction.

3. The information processing apparatus according to claim 2, wherein the control unit drives a position detection unit in conjunction with the irradiation unit, the position detection unit detecting a position of an object within an irradiation area of the image information.

4. The information processing apparatus according to claim 2, wherein the person detection unit detects a person by detecting heat.

5. The information processing apparatus according to claim 1, wherein the irradiation restart condition is a lapse of a predetermined time since the irradiation stop operation is performed.

6. The information processing apparatus according to claim 5, wherein the control unit sets the predetermined time on a basis of a distance between the information processing apparatus and an irradiation surface on which the image information is irradiated.

7. The information processing apparatus according to claim 1, wherein the person detection unit detects a person by detecting heat and is sensitivity adjustable, and
   the control unit adjusts the sensitivity of the person detection unit on a basis of the distance between the information processing apparatus and the irradiation surface on which the image information is irradiated.

8. The information processing apparatus according to claim 1, wherein the person detection unit can detect a face of a person, and
   the irradiation restart condition is that the person detection unit stops detecting a face of a person and then detects a face of a person again.

9. The information processing apparatus according to claim 1, wherein the person detection unit can detect a line of sight of a person, and
   the irradiation restart condition is that a line of sight of a person detected by the person detection unit moves outside the irradiation area of the image information and then moves back to the irradiation area of the image information.

10. The information processing apparatus according to claim 1, wherein the information processing apparatus includes the irradiation unit and the person detection unit.

11. An information processing method, comprising:
   controlling a person detection unit on a basis of an irradiation direction in which an irradiation unit capable of irradiating various image information irradiates the image information, wherein the irradiation direction includes at least one of a downward direction or an upward direction, detecting the irradiation direction,
   forming a detection area in a direction opposite to the irradiation direction,
   irradiating the image information in a case where the person detection unit detects a person,
   causing the irradiation unit to stop the irradiation of the image information in a case where a predetermined irradiation stop operation is performed, and
   stopping the operation of the person detection unit until a predetermined irradiation restart condition is satisfied after the irradiation stop operation is performed in a case where the irradiation direction is the upward direction.

12. A program stored on a non-transitory computer readable medium that causes a computer to implement a control function that controls a person detection unit on a basis of an irradiation direction in which an irradiation unit capable of irradiating various image information irradiates the image information, the person detection unit forming a detection area in a direction opposite to the irradiation direction, wherein the irradiation direction includes at least one of a downward direction or an upward direction,
   wherein the program causes the irradiation unit to irradiate the image information in a case where the person detection unit detects a person, and
   wherein the program determines the irradiation direction and causes the irradiation unit to stop the irradiation of the image information in a case where a predetermined irradiation stop operation is performed, and stops the operation of the person detection unit until a predetermined irradiation restart condition is satisfied after the irradiation stop operation is performed in a case where the irradiation direction is the upward direction.

\* \* \* \* \*